US009538814B2

(12) United States Patent
DelCielo

(10) Patent No.: US 9,538,814 B2
(45) Date of Patent: Jan. 10, 2017

(54) CORK OUTER SOLED SHOES AND METHOD FOR FABRICATION

(76) Inventor: Alex DelCielo, Howard Beach, NY (US)

(*) Notice: Subject to any disclaimer, the term of this patent is extended or adjusted under 35 U.S.C. 154(b) by 768 days.

(21) Appl. No.: 12/914,981

(22) Filed: Oct. 28, 2010

(65) Prior Publication Data

US 2011/0099853 A1 May 5, 2011

Related U.S. Application Data

(60) Provisional application No. 61/255,941, filed on Oct. 29, 2009.

(51) Int. Cl.
| | | |
|---|---|---|
| A43B 13/14 | (2006.01) | |
| A43D 8/00 | (2006.01) | |
| A43B 17/12 | (2006.01) | |
| A43B 13/08 | (2006.01) | |
| A43D 8/02 | (2006.01) | |
| B29D 35/12 | (2010.01) | |
| B29D 35/14 | (2010.01) | |
| A43B 13/02 | (2006.01) | |
| A43B 13/12 | (2006.01) | |
| A43B 13/16 | (2006.01) | |
| A43B 13/26 | (2006.01) | |

(Continued)

(52) U.S. Cl.
CPC ............... *A43B 17/12* (2013.01); *A43B 13/08* (2013.01); *A43D 8/02* (2013.01); *B29D 35/122* (2013.01); *B29D 35/142* (2013.01); *A43B 1/06* (2013.01); *A43B 3/108* (2013.01); *A43B 3/30* (2013.01); *A43B 7/125* (2013.01); *A43B 9/00* (2013.01); *A43B 9/02* (2013.01); *A43B 9/14* (2013.01); *A43B 13/02* (2013.01); *A43B 13/12* (2013.01); *A43B 13/14* (2013.01); *A43B 13/141* (2013.01); *A43B 13/143* (2013.01); *A43B 13/145* (2013.01); *A43B 13/16* (2013.01); *A43B 13/26* (2013.01); *A43B 13/32* (2013.01); *A43B 23/02* (2013.01); *A43D 8/04* (2013.01); *A43D 8/10* (2013.01); *B29D 35/0009* (2013.01); *B29D 35/0036* (2013.01); *B29D 35/0081* (2013.01); *B29D 35/061* (2013.01)

(58) Field of Classification Search
CPC ....... A43B 1/0027; A43B 13/02; A43B 13/12; A43B 13/14; A43B 13/143; A43B 13/145; A43B 13/16; A43B 13/26; A43B 13/32; A43B 23/02; A43B 3/108; A43B 3/30; A43B 13/141; A43B 9/00; A43B 9/02; A43B 3/14; A43B 7/125; B29D 35/061; B29D 35/0036; B29D 35/0081
USPC ....... 264/244; 425/119; 36/44, 25 R, 45, 83; 156/245
See application file for complete search history.

(56) References Cited

U.S. PATENT DOCUMENTS 1,978,549 A * 10/1934 Muir ................................ 428/87
3,114,281 A * 12/1963 Medrano ......................... 83/155

(Continued)

FOREIGN PATENT DOCUMENTS

GB 831191 * 3/1960
GB 1144149 A * 3/1969 ............... A43B 7/06

*Primary Examiner* — Philip Tucker
*Assistant Examiner* — Vicki Wu
(74) *Attorney, Agent, or Firm* — Ferdinand IP, LLC

(57) ABSTRACT

A process for fabricating shoes having an outer cork sole insert includes processing raw cork into sheets of predetermined thickness, adhering a thin fabric sheet to one side of the intermediate cork sheets, cutting out cork/fabric sole inserts and placing them into an injection mold, and cycling the plastic injection mold so as to form a cork insert into the plastic sole.

4 Claims, 10 Drawing Sheets m. finish product

(51) Int. Cl.

| | |
|---|---|
| A43B 13/32 | (2006.01) |
| A43B 23/02 | (2006.01) |
| A43B 3/10 | (2006.01) |
| A43B 3/30 | (2006.01) |
| B29D 35/06 | (2010.01) |
| B29D 35/00 | (2010.01) |
| A43B 9/00 | (2006.01) |
| A43B 9/02 | (2006.01) |
| A43B 9/14 | (2006.01) |
| A43B 7/12 | (2006.01) |
| A43B 1/06 | (2006.01) |
| A43D 8/04 | (2006.01) |
| A43D 8/10 | (2006.01) |

(56) References Cited

U.S. PATENT DOCUMENTS

| | | | | |
|---|---|---|---|---|
| 3,284,558 A | * | 11/1966 | Ludwig | 264/244 |
| 2003/0009919 A1 | * | 1/2003 | Stein | A43B 3/108 |
| | | | | 36/59 R |
| 2004/0020080 A1 | * | 2/2004 | Cox et al. | A43B 3/108 |
| | | | | 36/59 R |

* cited by examiner

1. Cork origin material making procedure ---
a. raw material b. press raw material, get piece by piece
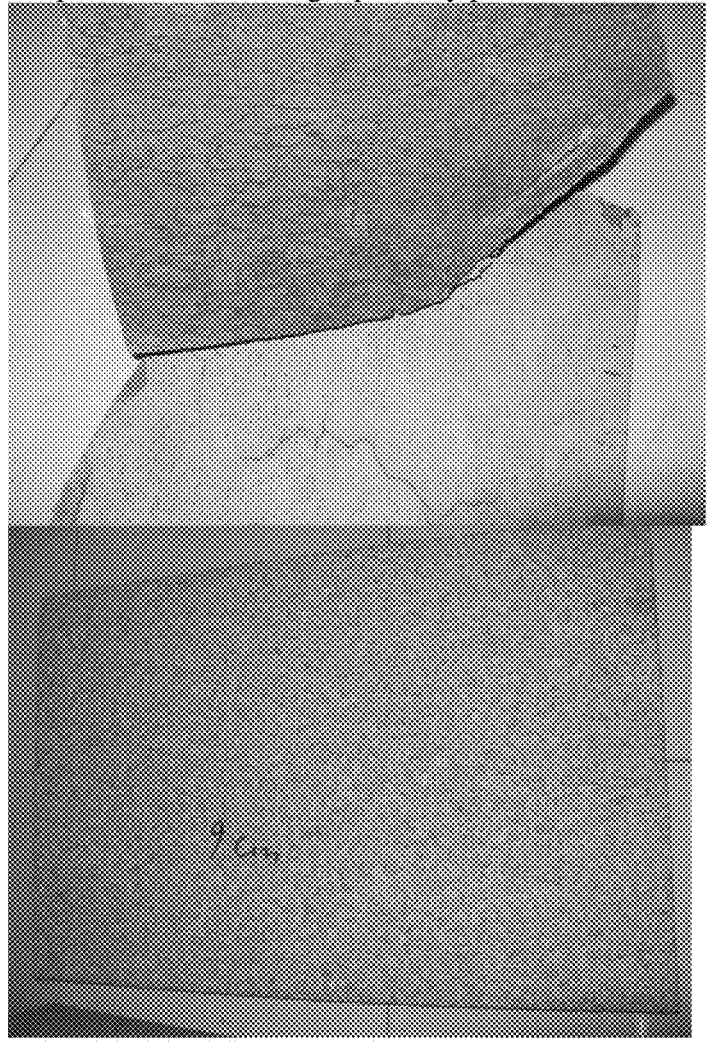
Fig. 4
Fig. 5
c. Skive the cork into correct thickness
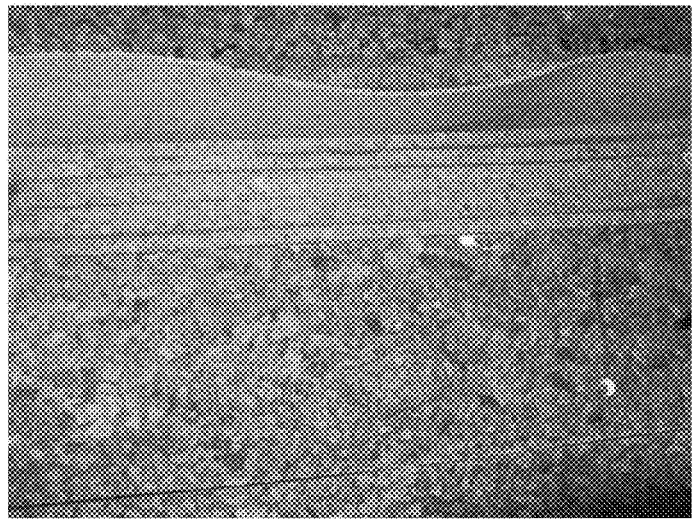
Fig. 6

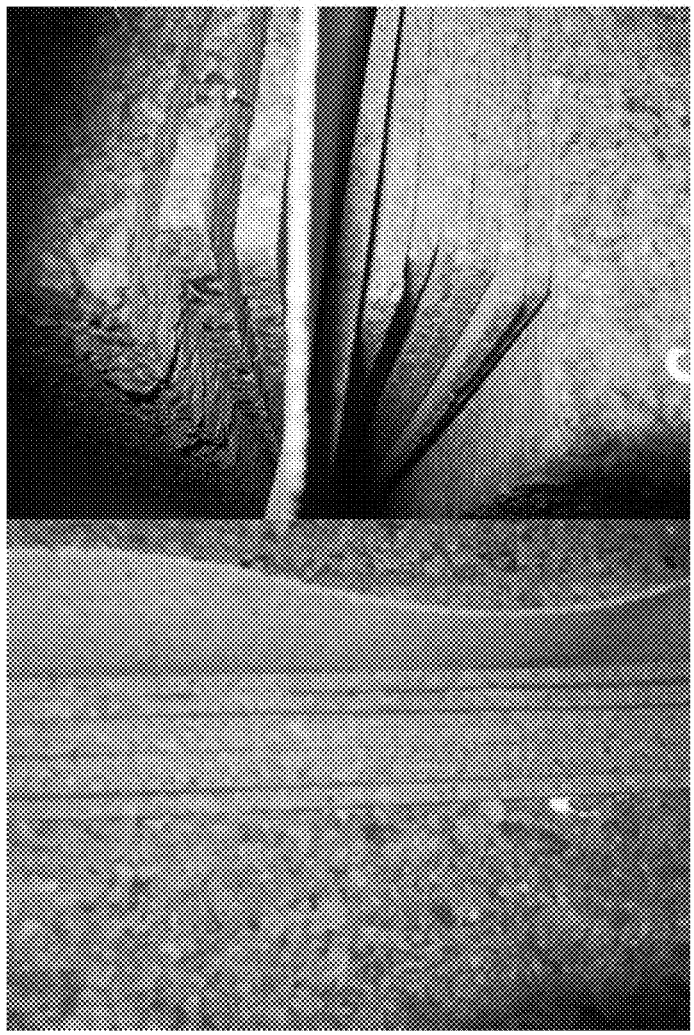
Fig. 7
Fig. 8
d. Put glue on the base fabric and skived cork
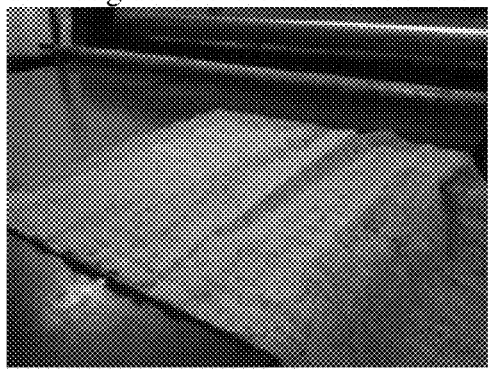
Fig. 9
e. Press both fabric & cork with heavy metal roll under high tempreture f. cork 2. Inject cork at front of sole bottom ---
a. lay out cork insert pattern on cork material b. cut cork material piece by piece, production is used cutting die
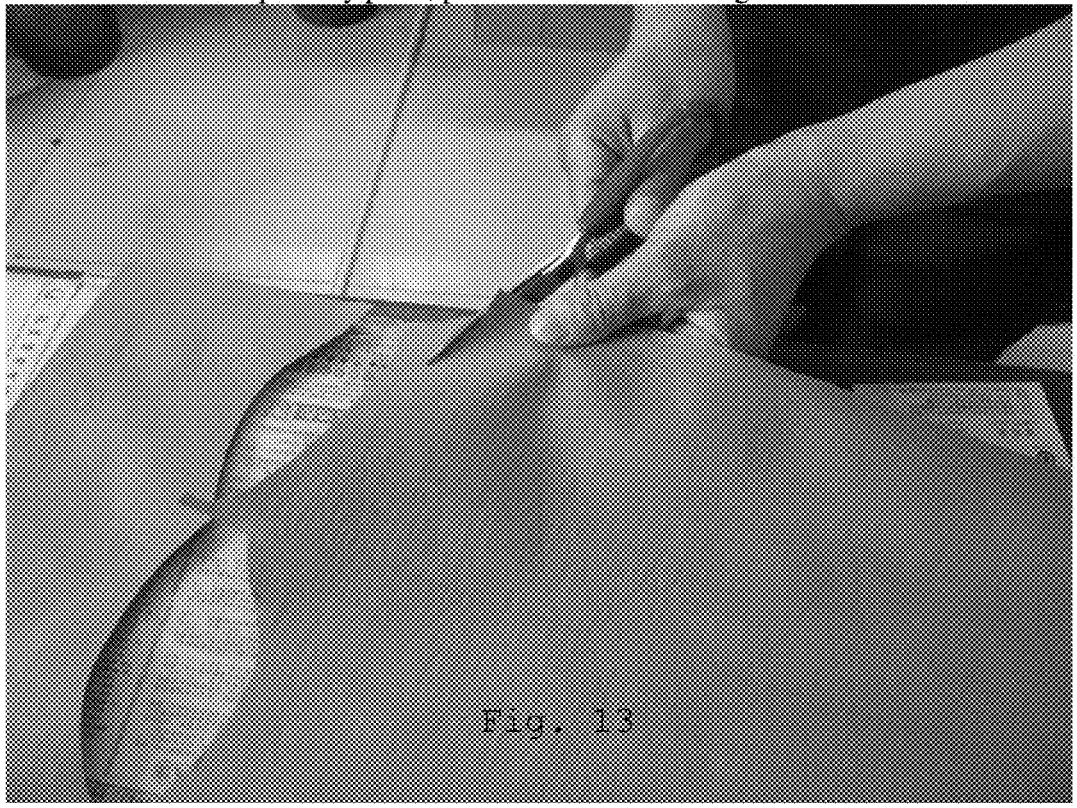
c. cork cutting piece before put into outsole mold
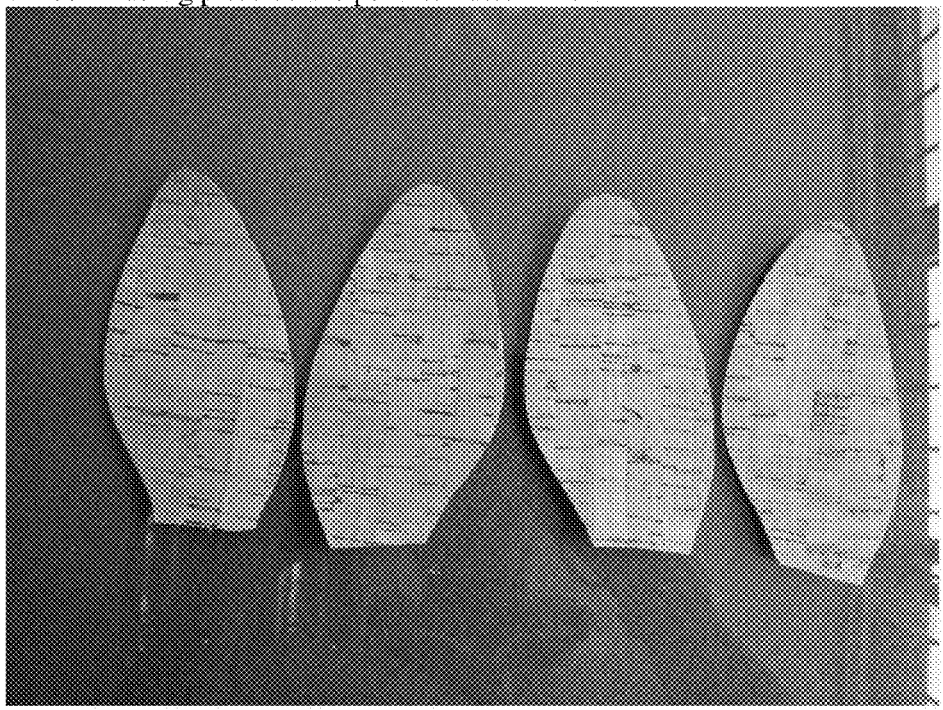
Fig. 14 d. outsole mold picture 1 e. outsole mold picture 2 f. put cork piece cutting inside outsole mold g. cork cutting piece material layout inside outsole mold h. close outsole mold and start to inject material i. machine injecting material inside the mold j. machine finish injection and open the mold k. finish outsole layout inside mold l. take out outsole from outsole mold m. finish product

CORK OUTER SOLED SHOES AND METHOD FOR FABRICATION

CROSS REFERENCES TO RELATED APPLICATIONS

This non-provisional patent application claims a priority benefit to U.S. Provisional Application No. 61/255,941 entitled "Cork outer soled shoes and method for fabrication" filed in the United States Patent and Trademark Office on Oct. 29, 2009 by a common Inventor to this instant application, Alex DelCielo. Further the above named Provisional Application is hereby incorporated by reference.

STATEMENT REGARDING FEDERALLY SPONSORED RESEARCH

Not Applicable

REFERENCE TO APPENDIX

Not Applicable

FIELD OF THE INVENTION

This invention relates to a cork soled shoe and methods and apparatus for fabricating foot wear using cork as an external durable surface.

BACKGROUND OF THE INVENTION

New, useful and aesthetically pleasing materials are constantly being sought out, discovered and applied to footwear. Although cork has been known for use on other surfaces of foot wear, it has not been previously used as a wearable sole or wearable portion of a sole. Cork has very desirable qualities for application in soles such as impact and shock absorption, skid resistance, durability, increased surface friction, and sound deadening characteristics as well as a pleasing aesthetic and unique look.

Thus there is a need for shoe soles having cork inserts on a walkable surface.

Such a product and or method of producing such product is heretofore unknown to the Inventor. In general this new product and method have the potential for creating unique foot wear with quieter, almost silent soles, which absorb unwanted and detrimental walking or running impacts to a consumer's joints or skeletal structure. Ambulatory health and safety are increased with a more an attractive, durable, quieter, skid free sole.

A shoe is generally formed of an upper, a lower attached to the upper, and an outsole attached to the lower. The outsole of the shoe is the exposed portion of the sole that contacts the ground or other supporting surface. The outsole provides many characteristics of the shoe such as the shoe's traction and stability with respect to the intended supporting surface. For example, the outsole of the shoe may be provided with some type of traction elements arranged in a pattern to provide a gripping action between the outsole and the ground or supporting surface. The outsole should also be manufactured so that it offers extended wear to permit the shoe to be worn for a lengthy period of time.

Often, the outsole of the shoe is formed of a rubber material or leather in designer shoes and the like. In men's and women's shoes, the outsole is very often substantially smooth and this can cause traction problems. For example, such outsoles are often very slippery because of their smooth texture and this increases the chances that the user may accidently slip or slide during normal use. The risk of slipping and sliding is increased significantly when the surface or supporting surface is wet or otherwise in a slippery state.

The outsole is an important component of the shoe for an additionally entirely unrelated reason which has gone unrecognized in the art of shoe sole construction. As the economies of most countries become more and more internationalized, international commercial transactions invoke national customs tariffs that generally must be paid when goods are shipped. Under the Harmonized Tariff Schedules of each country, goods are classified under various categories. For example, most footwear is classified under Chapter 64 of the United States Harmonized Tariff Schedules which covers the importation of goods into the United States. Within this chapter, the following major headings are recited for footwear: 1 6401 Waterproof Rubber or Plastic Footwear; 6402 Other Footwear with Uppers and Outersoles of Rubber or Plastic; 6403 Footwear with Uppers of Leather and Outersoles Of Rubber, Plastic, Leather, or Composition Leather; 6404 Footwear with Uppers of Textiles and Outersoles of Rubber, Plastic, Leather, or Composition Leather; and 6405 Other Footwear.

Accordingly, footwear is generally classified in a given heading based upon the material of the upper and the material of the outersole. Consequently, the outsole plays an important role in determining the rate of duty which is to be applied to the specific footwear article. Depending upon the material which is used to manufacture the upper and the sole, the rate of the duty may vary significantly. For example, the rate of duty may range from 37.5% ad valorem for many common types of footwear to 3% ad valorem for certain types of sandals and similar footwear. In determining the applicability of a particular section of one chapter of the United States Harmonized Tariff Schedules, knowledge of specific details of the material is necessary. For example, a classification may be based on the type of material that is present on 50% or more of the bottom surface of the shoe (outersole) that contacts the ground.

Over many years, manufacturers have focused their attention on improving the traction properties of shoe outsole construction, but have not recognized that a price advantage can be had by combining materials in the outer shoe sole construction.

What is needed in the art and has heretofore not been available is an outsole and method of manufacture thereof which offers slip resistance and other desirable properties in addition to providing a competitive advantage to the manufacturer based on its construction.

BRIEF SUMMARY OF THE INVENTION

Raw cork is obtained in rough sheets and processed into sheets of a predetermined thickness, adhered to a thin fabric backing material, cut into appropriate sole shapes and sizes and finally molded into a shoe sole in an injection molding system producing a new and unique shoe sole.

OBJECTS AND ADVANTAGES

The primary purpose of this invention is to fabricate a unique shoe sole having a wearable, walkable cork insert.

Accordingly, several objects and advantages of our invention are:

(a) to provide cork soled shoe whereby the cork surface is a major portion of the outer wearable sole;

(b) to provide a method for fabricating such cork soled shoes using raw cork and an injection molding system;

(c) to provide a shoe sole with almost noiseless acoustic characteristics;

(d) to provide shoe with impact absorption characteristics to lessen joint stress when ambulating;

(e) to provide a new shoe sole design that is aesthetically pleasing in fashion; and (f) to provide a foot wear product that has a significantly lower import US Tariff Schedule than conventional foot wear.

Further objects and advantages of my invention will become apparent from a consideration of the drawings and ensuing description.

BRIEF DESCRIPTION OF THE DRAWINGS

FIGS. 4 & 5 are perspective views of cork after pressing;

FIGS. 6-8 are perspective views of the cork after skiving;

FIGS. 9-11 are perspective views of glue being applied to the cork and base fabric;

FIGS. 12-14 are perspective views of the cork layout and cutting process;

DETAILED DESCRIPTION OF THE INVENTION

Figures 1, 2, 3:
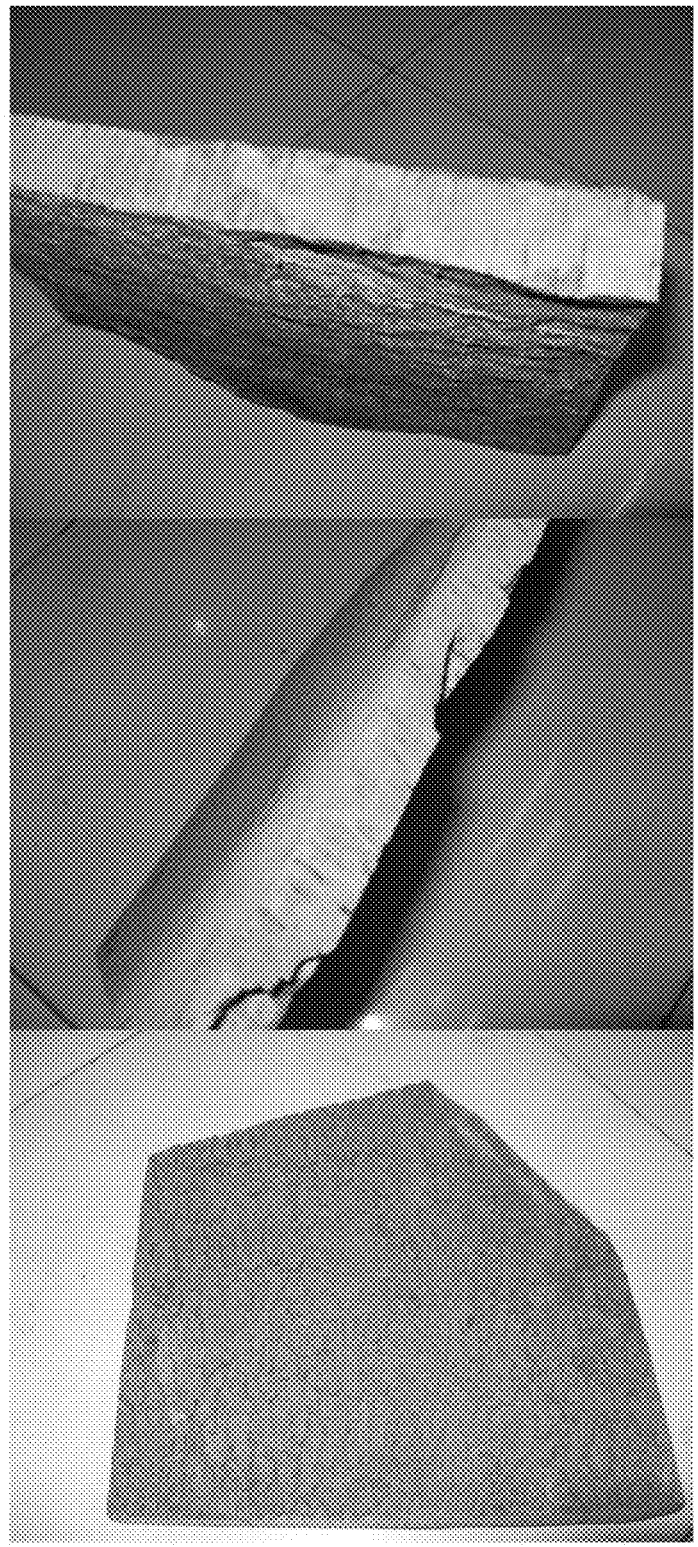
FIGS. 1-3 are various perspective views of cork as the raw material.

Referring now to FIGS. 1-3, several perspective views of the raw cork origin material are shown. The sheets of raw material are rough and vary in thickness.

Referring now to FIGS. 4-5, the cork sheets are run through a press.

Referring now to FIGS. 6-8, the court sheets are skived into a desired thickness.

Figure 10:
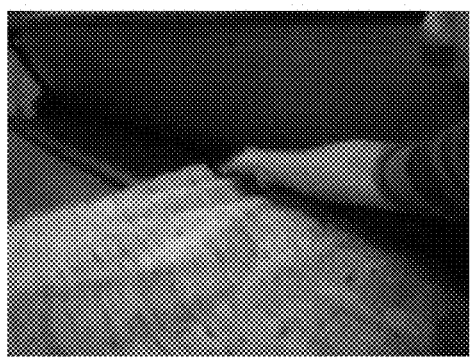
Figure 11:
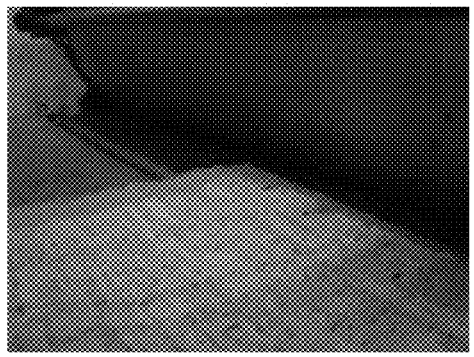

Referring now to FIGS. 9-11, a thin layer of base fabric is applied to one side of the cork sheet. First glue is applied to both the fabric and the cork; then they are pressed together under a heavy metal roller and high temperature. The fabric and cork are now bonded to each other.

Figure 12:
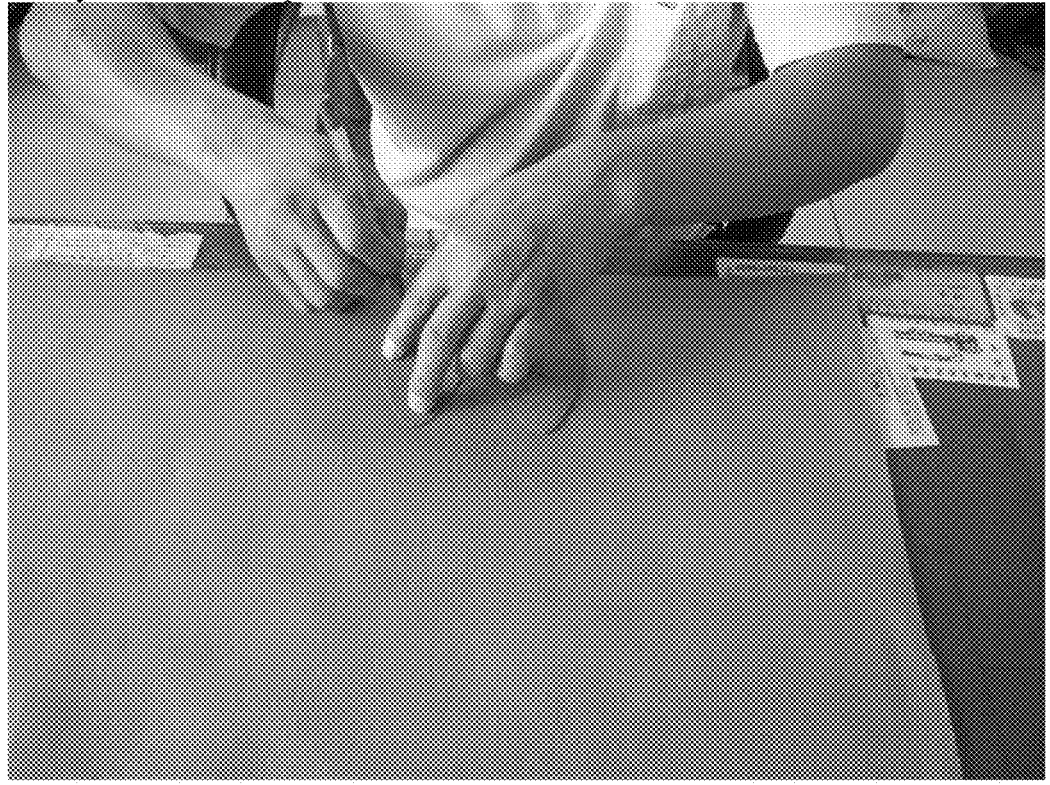

Referring now to FIGS. 12-14, the desired sole patterns are marked out on the cork/fabric sheet. Next they are cut out from the sheet. A stamping process may be used for production volumes.

Figure 15:
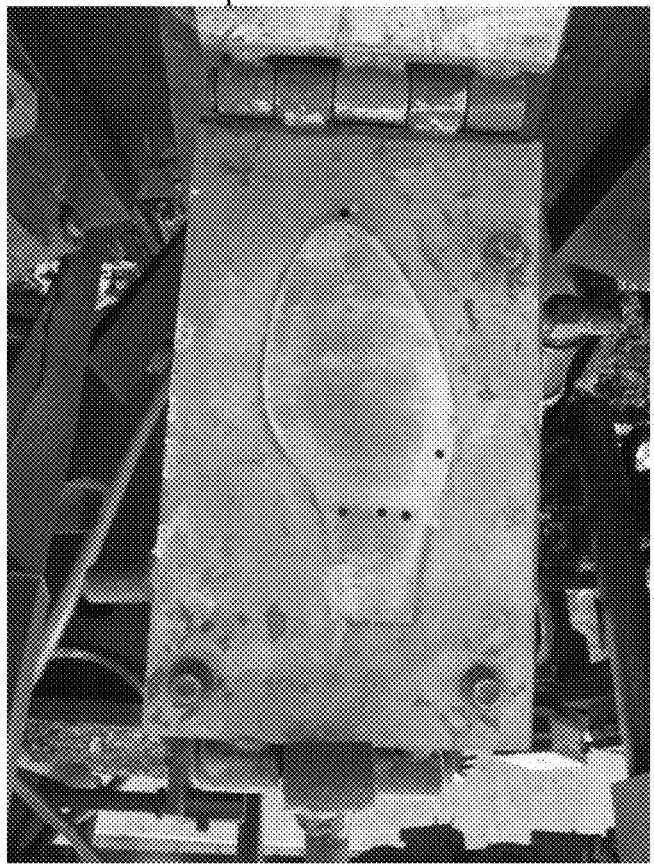
FIGS. 15-16 are perspective views of the sole mold.
Figure 16:
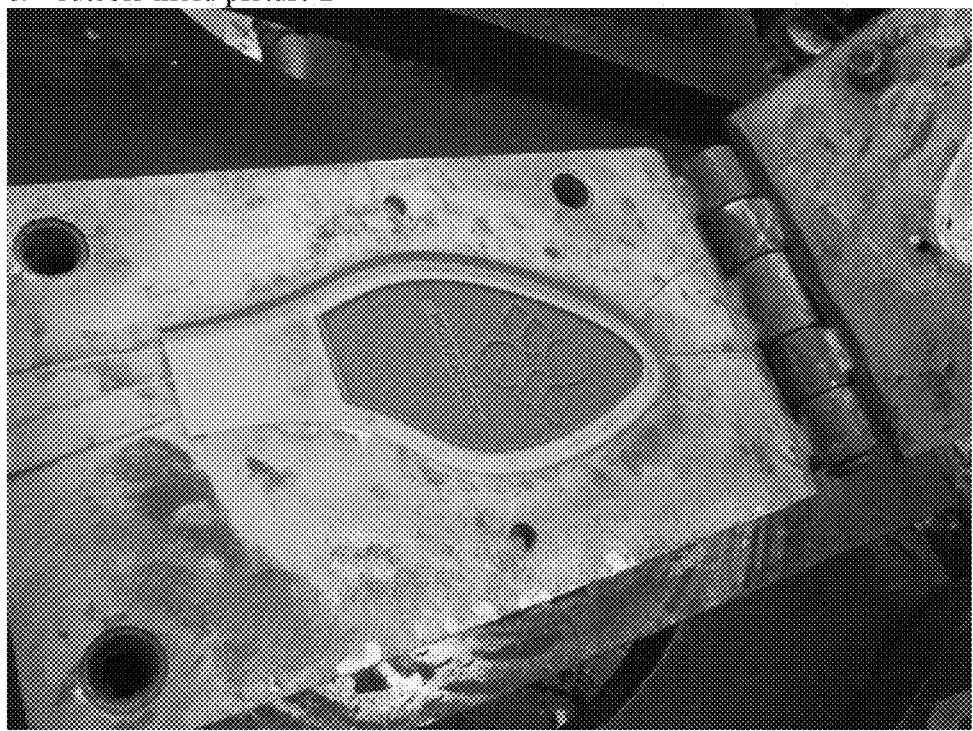

In FIGS. 15-16 the molds are opened, cleaned and prepared to receive the cork soles.

Figure 17:
FIGS. 17-18 are perspective views of the cork layout piece being positioned into the mold.
Figure 18:
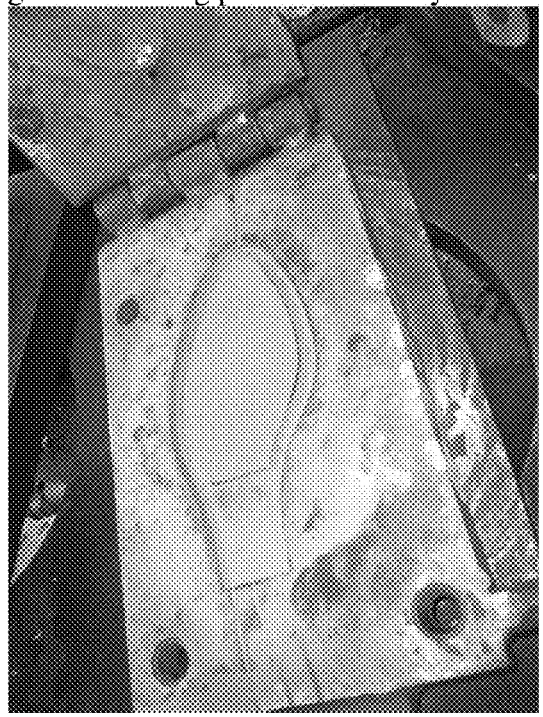

Referring now to FIGS. 17-18, the cork soles are placed into the molds.

Figure 19:
FIGS. 19-20 are perspective views of the molding process.
Figure 20:
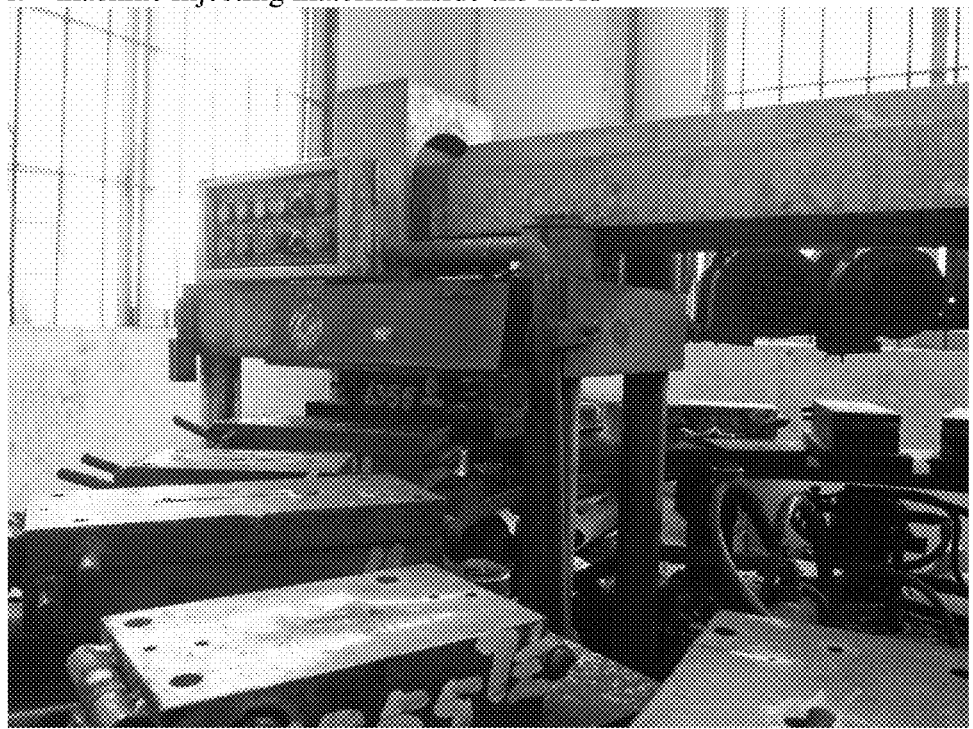

Referring now to FIGS. 19-20, the mold is closed and the injection/heating/pressure process begins.

Figure 21:
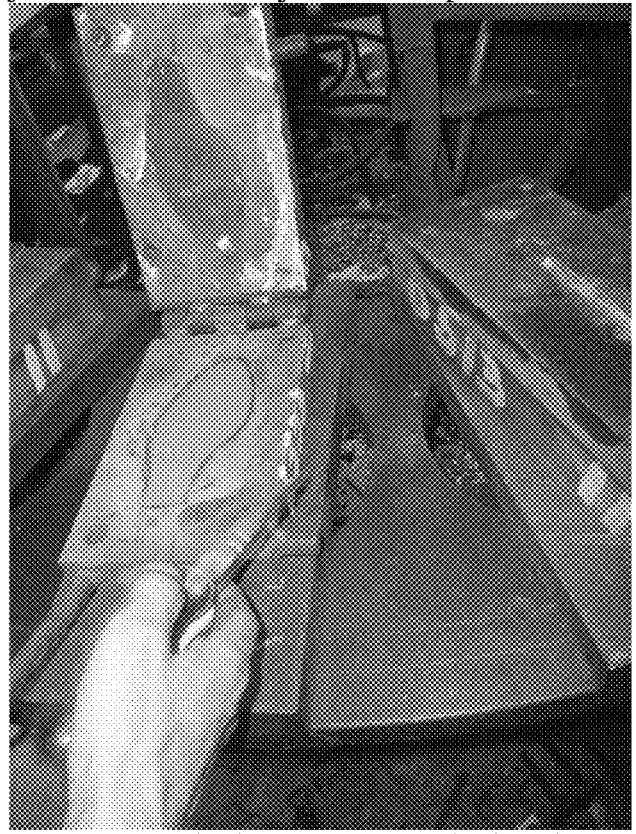
FIGS. 21-22 are perspective views of opening the mold after the process.
Figure 22:
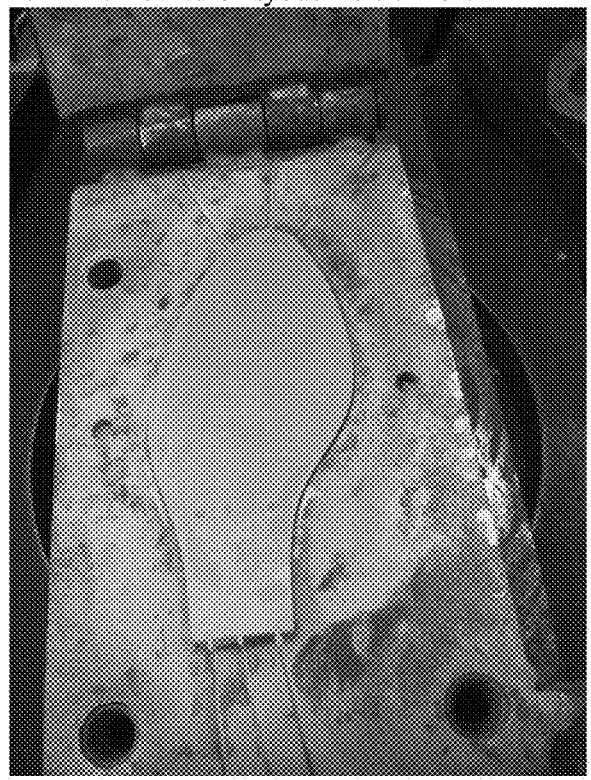

Referring now to FIGS. 21-22, the molding process is complete and the molds are opened.

Figure 23:
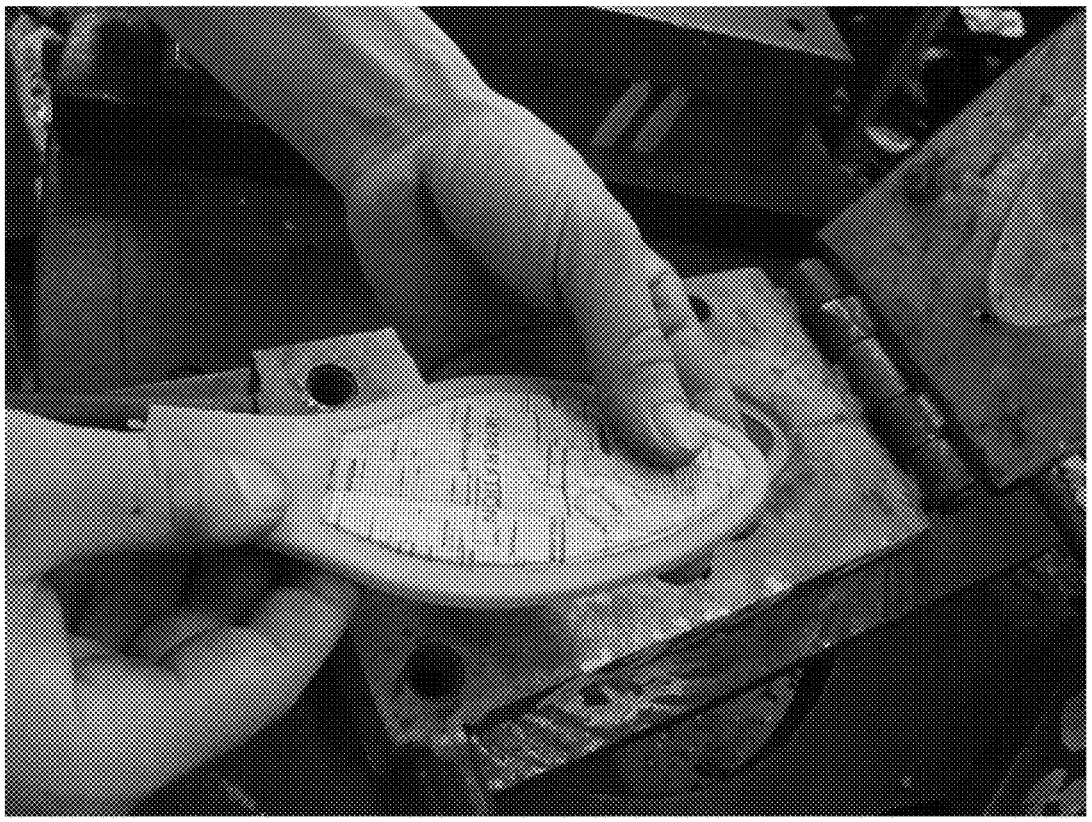
FIGS. 23-24 are perspective views of inspecting the newly fabricated sole with a cork exterior.
Figure 24:
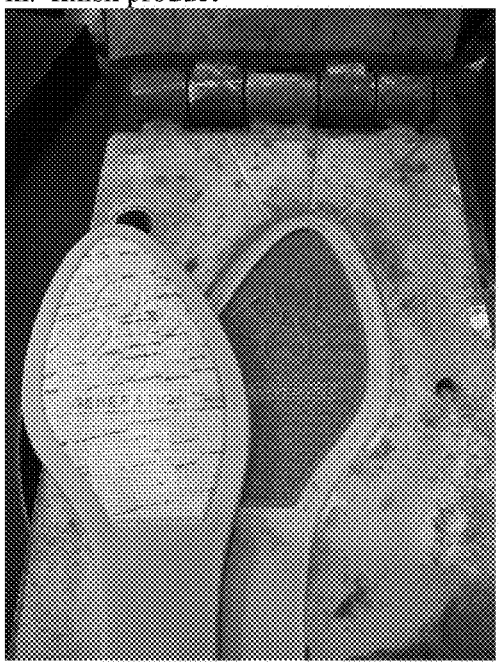

Referring now to FIGS. 23-24, the finished cork sole inserts are removed from the molds and inspected.

The soles are now ready for attachment to a variety of different style foot wear, boots, sandals or shoes as is known in the art.

Finally, another advantage of my cork outer sole invention has to do with importing foot wear into the United States. Over the last quarter century or more, US domestic shoe manufacturing has been continuously moving off shore due to competition from foreign labor and manufacturing costs; yet the demand for shoes in the US only continues to grow. Therefore millions upon millions of shoes are now imported into the US each year to meet this shortfall.

Importing goods into the US is a specialized process and one important component is complying with US tariffs on goods. The United States International Trade Commission issues the Harmonized Tariff Schedule (HTS) which assigns varying tariffs to different goods. Footwear is highly regulated under HTS.

For shoes the HTS tariff varies by certain qualities of the shoe such as materials used for the upper, or materials used for the outer sole. These different classifications have significant economic impact on the shoe as certain HTS schedules for shoes may range from a low of 7.5% to a high of 37.5%.

The HTS classification of my cork outer sole invention would allow an importer to obtain the benefit of lower tariff schedules. For example in both Section 6402 (footwear with uppers of rubber or plastic) and Section 6404 (footwear with uppers of textile material), the tariff depends upon construction materials.

Under Section 6402 (footwear with uppers of rubber or plastic) if the upper shoe is not at least 90% rubber or plastic, then the importer would pay a duty of 37.5%. My cork outer sole would place this shoe into HTS 6405.90.90 (12.5% duty).

Under Section 6404 (footwear with uppers of textile material) there are numerous categories which carry a duty of 37.5%. However, a shoe with my cork outer sole invention, would be classified into either 6405.20.30 (7.5% duty) or 6405.20.90 (12.5% duty).

Thus under the current HTS schedule, my invention provides a tremendous economic benefit to the importer and to the consumer as well.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

I claim:

1. A method for fabricating foot wear having a sole with a cork insert for use as a durable, walkable, wearable bottom surface on said foot wear, said method comprising:

obtaining cork in raw sheet form;

processing the raw sheet in a press;

slicing the raw sheets into an intermediate cork sheet of predetermined thickness;

adhering a thin fabric sheet to one side of the intermediate cork sheet using an adhesive, pressure roller and high temperature process rendering a cork/fabric sheet having a substantially planar cork surface on a first side and a substantially planar fabric surface on a second side;

tracing sole patterns onto the cork/fabric sheet;

cutting the sole patterns out of the cork/fabric sheet;

inserting the cork/fabric sole pattern into a sole mold positioned with the cork surface adjacent a mold surface to prevent mold material from flowing onto the cork surface of the cork/fabric sheet;

closing the mold and executing an injection cycle,
  wherein the injection cycle produces a finished sole
  with an outersole surface comprising:
    a first portion of cork having an exposed surface;
    a second portion of an injectable material adjacent the exposed cork;
opening the mold and removing the finished sole; and
  wherein, the planar fabric surface is disposed between the first portion of exposed cork and an interior portion of the injectable material that is bonded to the fabric surface;
attaching said finished sole to a foot wear upper; and
wherein the outersole surface is the wearable bottom surface of the foot wear, and further wherein the exposed surface of the first portion of cork contacts the ground when the foot wear is worn.

2. A method for fabricating foot wear having a cork sole insert for use as a durable, walkable, wearable bottom surface on said foot wear according to claim 1, wherein said foot wear comprises a shoe.

3. A method for fabricating foot wear having a cork sole insert for use as a durable, walkable, wearable bottom surface on said foot wear according to claim 1, wherein said foot wear comprises a boot.

4. A method for fabricating foot wear having a cork sole insert for use as a durable, walkable, wearable bottom surface on said foot wear according to claim 1, wherein said foot wear comprises a sandal.

* * * * *